Patented Apr. 22, 1930

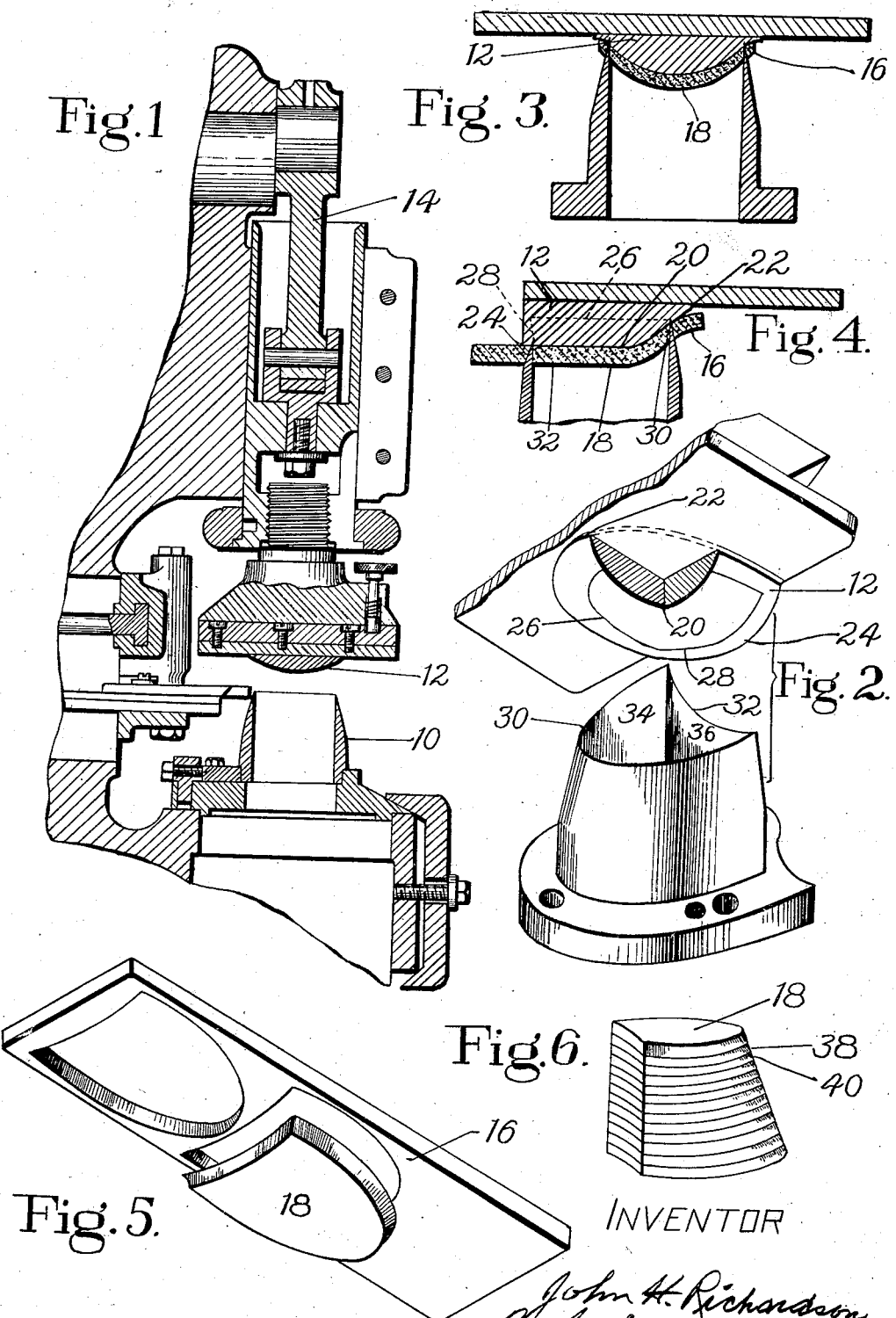

1,755,191

UNITED STATES PATENT OFFICE

JOHN H. RICHARDSON, OF MELROSE, MASSACHUSETTS, ASSIGNOR TO UNITED SHOE MACHINERY CORPORATION, OF PATERSON, NEW JERSEY, A CORPORATION OF NEW JERSEY

MACHINE FOR MANUFACTURING ARTICLES FROM SHEET MATERIAL

Application filed August 11, 1926. Serial No. 128,629.

This invention relates to machines for manufacturing articles from sheet material and is herein exemplified in its application to the preparation of heel lifts for boots and shoes.

Heretofore, considerable difficulty has been experienced in dieing-out articles or blanks from sheet material where the required blanks comprise lateral surfaces extending at different inclinations with respect to the top and bottom faces of the articles. Typical examples of such articles are top-lifts for heels of boots and shoes, and built-up heels composed of heel lifts in which such top-lifts or heel-lifts have beveled side and back edge portions and a breast edge portion substantially perpendicular to a face of the lift.

In machines for producing blanks of the type referred to, use has been made of dies having flexible cutting edges, which, in operation upon sheet material, are caused to expand in such manner as to produce different degrees of bevel upon a blank. An objection to the use of dies of this type is that the variation in the amount of bevel which can be produced on different portions of the lateral surfaces of a blank is limited, and, consequently, the resultant blanks are not uniform in character. Also, where use has been made of dies comprising curved as well as straight cutting edges, it has been found difficult to produce perfect blanks due to the irregular action of the dies at the junctures of the curved and straight edges.

Accordingly, an object of the present invention is to provide an improved machine for operating upon sheet material for producing blanks having lateral surfaces extending at various angles with respect to the top and bottom surfaces of the blanks.

To this end, and as illustrated, the invention provides mechanism comprising a cutting block provided with a curved surface, and a die relatively movable to effect the dieing-out operation, the cutting block operating to deform rubber or other sheet material positioned in operative relation to the die and being effective upon relative movement of the cutting block and the die to cause the material to be held thus deformed as it is forced against the cutting edges of the die to sever a blank therefrom. As illustrated, the die is formed with cutting edges of different curvatures conforming to the curvature of the cutting block which operates to bend unequally different portions of the material to be severed, so that the different portions are presented at different angles to the cutting edges of the die. Thus in the use of the machine for producing heel lifts, the heel lifts severed from the sheet material are each provided with beveled edges angularly related to each other.

In the drawings:

Fig. 1 is a cross-sectional view of a machine in which the invention is embodied;

Fig. 2 is a perspective view, partly in section, of the cutting block and die according to the invention;

Fig. 3 is a transverse cross-section through the cutting block and die illustrating the cutting operation upon a strip of material;

Fig. 4 is a longitudinal cross-section on line 4—4 of Fig. 3;

Fig. 5 is a perspective view of a strip of material and a lift which has been cut therefrom;

Fig. 6 is a perspective view of a heel built of beveled lifts according to the invention.

The illustrated machine, as shown in Fig. 1, comprises a stationary die 10 supported with its cutting edges uppermost, and a cutting block 12, connected to a pitman 14, movable toward and from the die to effect dieing-out operations upon a strip of material fed across the upper surface of the die by means of intermittently acting feed mechanism (not shown). As herein shown, the die 10 is a heel lift die, formed hollow in order to receive the lifts as they are died out. Except as hereinafter fully described, these parts of the machine are constructed and operate as disclosed in United States Letters Patent No. 1,291,726, granted Jan. 21, 1919, on application of W. C. Baxter, and reference may be had to the aforementioned Letters Patent for a more detailed description of parts of the machine not fully described herein.

The illustrated machine is especially designed to facilitate the dieing-out of heel lifts in such a manner that each lift will be formed with beveled side and back edge portions and a breast edge portion substantially perpendicular to the faces of the lift.

To this end, the lower face of the cutting block 12 is bulged outwardly as shown in Fig. 2 so that upon descent of the cutting block a strip of flexible material 16 (Fig. 4), such as rubber, leather, or leatherboard, supported on the upper surface of the die 10, will be bent and thus deformed into such position that a portion of its surface will be presented to the die at an acute angle to one cutting edge thereof and so that another portion of the surface of the material will be presented to the die at right angles to another cutting edge, continued downward movement of the cutting block resulting in the formation of a heel lift blank such as is indicated by the numeral 18.

That portion of the block 12 which serves to force into the die the material to form the back of a lift is sharply curved longitudinally of the block 12, as shown in Figs. 2 and 4 between the points 20 and 22. This portion of the block surface is also curved in a lateral direction, transverse sections being similar in shape to the section disclosed in Fig. 3 but decreasing in size toward point 22. The remainder of the lowest surface of the block which serves to force into the die the material forming the part of a lift adjacent to the breast edge, extends longitudinally from 20 to 24, and is curved in a transverse direction only, is shown in Figs. 2, 3 and 4.

In order to ensure clean cutting of the material, the cutting block 12 is provided with grooves 26 and 28 adapted to receive the cutting edges of the die 10. For a description of similar grooves and the manner in which they are formed reference may be had to the aforementioned Letters Patent.

The die 10 is provided with a U-shaped cutting edge 30 adapted to co-operate with the block surface along the groove 26 to produce the curved side and back edge portions of a heel lift. The die 10 is further provided with an edge 32, concave in shape, and extending substantially in a plane at right angles to the plane of the edge 30 in order closely to conform to the surface of the cutting block along the groove 28. Preferably, the edge 32 is also slightly curved inwardly in order to produce a correspondingly curved breast edge on lifts. Interior walls 34 and 36 of the die are perpendicular to the plane of the U-shaped cutting edge 30. Consequently each element of the surfaces constituting the U-shaped edge portion of a lift 18 as it is forced into the die during the dieing-out operation will be perpendicular to the upper surface of the strip 16 as supported on the edge 30 of the die before distortion of the material, and at an angle with respect to the surface of the material as it is held in distorted position. At the same time, the surface of the breast edge portion of a lift as it is forced into the die will be perpendicular to the upper surface of the strip 16 as originally supported on the die.

In utilizing the apparatus above described, a strip of flexible material such as, for example, rubber, leather or leatherboard, is positioned on the die 10 and the cutting block 12 is moved toward the die. As the block descends the lower surface thereof will contact with the surface of the strip, deforming it in such manner that that part of said strip surface over the die assumes a shape closely conforming to the surface of the block. Upon further descent of the block, the material so deformed is forced upon the cutting edges 30 and 32 of the die thus producing a lift. It is to be noted that, as indicated by the grooves 26 and 28 which are well within the periphery of the block 12, the area of the convex surface of the block is substantially greater than the area bounded by the cutting edges 30 and 32 of the die 10. Consequently, there will be no sharp break in the curvature of the material near the cutting edges as the blank is deformed, and the portions of the block surface outside of the grooves 26 and 28 will assist in pressing the material firmly upon the edges of the die.

On removal of a lift from the die, the material which was held in distorted position in the die will spring back into its original position, thus forming beveled edges on the back and sides of the lift, and since the material forming the breast edge portion was bent substantially along the line of cut which was made perpendicular to the lift surface the breast edge of the lift will be substantially at right angles to the faces of the lift.

The die and cutting block, as shown, are suitable for the production of lifts of one size only, but it will be apparent that lifts of various sizes may be formed in a similar manner by making use of dies of different sizes. Lifts of the type shown and described may be utilized in building heels. In this event one or more series of lifts of graded sizes such as lifts 18, 38 and 40 (Fig. 6) are produced, the bevel of each lift corresponding to the bevel of the heel of which it is to form a part, and the lifts are assembled in a graded heel pile such that curved back and side surfaces of the lifts form the pitched surfaces of a heel, and the vertical breast edge surfaces of the lifts form the breast surface of the heel. In this manner a heel pile is formed substantially to the final size and shape of a finished heel.

It is to be understood that, while this invention has been illustrated and described in connection with heels and parts thereof, the apparatus may be used for the production of other shoe parts.

Having described the invention, what is claimed as new and desired to secure by Letters Patent of the United States is:

1. In a machine for producing heel lifts, a die having a plurality of cutting edges, and a cutting block having a convex surface of varying curvature and of substantially greater area than that bounded by the cutting edges of the die, the construction and arrangement being such that one of the cutting edges is of substantially the same curvature as that of a portion of the convex surface for co-operation therewith in forming the side and back edge portions of a blank, and another cutting edge is of substantially the same curvature as another portion of the block surface for co-operation therewith in forming the breast edge portion of the blank.

2. In a machine for dieing-out heel lifts, a cutting block having a curved surface, and a die provided with a U-shaped cutting edge for co-operation with the block surface to produce the side and back edge portions of a heel lift, and a concave edge extending substantially in a plane at right angles to the plane of the U-shaped edge for co-operation with the block surface to produce the breast edge portion of the heel lift.

3. In a machine for dieing-out heel lifts, a cutting block and a die arranged for movement relatively to each other for effecting dieing-out operations upon sheet material, the cutting block being provided with a convex surface, the die being provided with a cutting edge of a shape corresponding to portions of the surface of the block extending in a longitudinal direction for co-operating with said surface during a dieing-out operation to form the side and back edges of a heel lift, the die also being provided with a second cutting edge of a shape corresponding to the curvature of the block in a transverse direction for co-operating with the cutting block surface to form the breast edge portion of a heel lift.

4. In a machine for operating on sheet material to produce shoe-part blanks, a cutting block, and a die having cutting edges, means for moving the cutting block relatively to the die to effect dieing-out operations on sheet material, the block having a convex surface of substantially greater area than that bounded by the cutting edges of the die for forcing the material into the die to form blanks, and the die having a plurality of cutting edges extending at different angles with respect to the cutting block surface for co-operation therewith in producing blanks having lateral surfaces extending at various angles to the faces of the blanks.

5. A heel-lift die comprising vertical side walls terminating in a U-shaped cutting edge, and in a connecting breast cutting edge, the breast cutting edge terminating short of the plane of the U-shaped cutting edge.

6. A heel-lift die comprising a U-shaped cutting edge, and a concave breast cutting edge extending from the ends of the U-shaped cutting edge and at an angle to the plane of the U-shaped edge.

7. A heel-lift die having a U-shaped cutting edge for producing the side and back edge portions of a heel lift, and a concave edge extending substantially in a plane at right angles to the plane of the U-shaped edge for producing the breast edge portion of the heel lift.

In testimony whereof I have signed my name to this specification.

JOHN H. RICHARDSON.